No. 723,959. PATENTED MAR. 31, 1903.
W. M. WHEILDON.
APPARATUS FOR CREMATING PUTRESCIBLE WASTE MATERIALS.
APPLICATION FILED JUNE 26, 1900.
NO MODEL. 5 SHEETS—SHEET 1.

Fig. 1

Witnesses: Inventor
William Maxwell Wheildon
by Dyer Edmonds & Dyer
Att'ys

No. 723,959. PATENTED MAR. 31, 1903.
W. M. WHEILDON.
APPARATUS FOR CREMATING PUTRESCIBLE WASTE MATERIALS.
APPLICATION FILED JUNE 28, 1900.
NO MODEL. 5 SHEETS—SHEET 3.

Fig. 3

Witnesses: Inventor
Jas. F. Coleman William Maxwell Wheildon
Jno. R. Taylor by Ayer Edmonds & Ayer
Att'ys.

No. 723,959. PATENTED MAR. 31, 1903.
W. M. WHEILDON.
APPARATUS FOR CREMATING PUTRESCIBLE WASTE MATERIALS.
APPLICATION FILED JUNE 26, 1900.
NO MODEL. 5 SHEETS—SHEET 4.

Witnesses:
Inventor
William Maxwell Wheildon
by Ayer Edmonds & Ayer
Att'ys

No. 723,959. PATENTED MAR. 31, 1903.
W. M. WHEILDON.
APPARATUS FOR CREMATING PUTRESCIBLE WASTE MATERIALS.
APPLICATION FILED JUNE 26, 1900.
NO MODEL. 5 SHEETS—SHEET 5.

Fig. 5

Witnesses:

Inventor
William Maxwell Wheildon
by Ayer Edmonds & Ayer
Att'ys.

UNITED STATES PATENT OFFICE.

WILLIAM MAXWELL WHEILDON, OF BOSTON, MASSACHUSETTS, ASSIGNOR TO THE ECONOMIC-SANITARY COMPANY, OF NEW YORK, N. Y., A CORPORATION OF MONTANA.

APPARATUS FOR CREMATING PUTRESCIBLE WASTE MATERIALS.

SPECIFICATION forming part of Letters Patent No. 723,959, dated March 31, 1903.

Application filed June 26, 1900. Serial No. 21,637. (No model.)

*To all whom it may concern:*

Be it known that I, WILLIAM MAXWELL WHEILDON, a citizen of the United States, residing at Boston, in the county of Suffolk and State of Massachusetts, have invented a certain new and useful Improvement in Apparatus for Cremating Putrescible Waste Materials, of which the following is a specification.

My invention relates to an improved apparatus for cremating or incinerating putrescible waste materials of any kind and from any ordinary source—as, for instance, garbage, sewer-sludge, and combustible city refuse, including dead animals.

My object, generally speaking, is to provide a simple and efficient apparatus for the purpose wherein the materials may be incinerated, their solid constituents converted to ash, the contained water evolved as steam, and any gases generated therefrom by the heat rendered inodorous by being dissociated or consumed, such operations being performed expeditiously and at a minimum cost.

In carrying my invention into effect I employ a rotary inclined cylindrical incinerating-furnace suitably lined with fire-brick and connected at its discharge or lower end with a stationary furnace having, preferably, a plurality of grates, as will be explained, the putrescible material being fed to the feed or upper end of the cylindrical furnace through a water-jacketed feed-pipe, whereby the material will be progressed at the desired speed through the cylinder toward the stationary furnace, meeting in its travel the products of combustion derived not only from the stationary furnace, but from the combustion of the putrescible matter from which water may have been driven off and which has become ignited as it approaches the lower end of the cylinder. In this way I provide for the most effective incineration of the material, since the material from which water has been driven off will in being consumed act to incinerate or cremate the succeeding material introduced within the furnace.

In further carrying my invention into effect I employ an air-mixing or gas-combustion chamber, which is connected to the upper or feed end of the cylinder-furnace and in which the gases driven off from the material will be mixed with an additional supply of air by which to effect their decomposition under the presence of the high heat derived in said chamber from the combustion in the cylinder-furnace, whereby the vapors and gases from said chamber will be discharged in an entirely inodorous and innocuous condition. The type of gas-combustion chamber which I employ is similar to that suggested in patents to Storer, No. 481,680, of October 30, 1892, No. 518,285, of April 17, 1894, and No. 539,096, of May 14, 1895, the particular point of novelty in my present construction, so far as this feature is concerned, residing in the new location thereof adjacent to the feed or upper end of the cylinder instead of at the discharge or lower end thereof, as suggested by Storer.

In further carrying my invention into effect I employ a suitable storage-hopper for containing the putrescible material and, if desired, for accumulating such material therein, and I provide said hopper with an improved form of feed by which the material may be fed therefrom and delivered into the water-jacketed feed-pipe. The advantage of employing a storage-hopper, as stated, is that in some instances it may be desirable to operate the boilers of a municipal electric-lighting plant by the heat generated from the incineration of the city garbage, in which case, as well as in possibly others which may arise in practice, it will be desirable to carry on the incinerating operations only during the night-time, so that a storage-tank for accumulating the material delivered thereto during the day becomes a necessity.

In further carrying my invention into effect I employ, in combination with the feed-hopper, an inclosed gas-tight elevator of novel form for elevating the putrescible material from the street-level and depositing it into said hopper, whereby the operations of receiving the material from the carts and depositing it into the storage hopper or receptacle can be carried on without nuisance.

In further carrying my invention into effect I employ, as stated, a stationary furnace connecting with the discharge end of the rotary cylinder-furnace and employing, preferably, three fire-boxes, the first being arranged immediately below the discharge end of the rotary cylinder-furnace, so as to receive any large lumps of material which may be discharged from the cylinder-furnace without being thoroughly incinerated therein because of their bulk, which particles will therefore be permitted to be entirely consumed upon said grate, the second grate being arranged adjacent to the first grate and adapted to contain a fire, from which may be ignited a stream of pulverized fuel delivered above the same, the products of combustion from the stream of burning pulverized fuel passing directly into the rotary cylinder-furnace, so as to incinerate the material therein, and the third grate being of large area, occupying the bulk of the stationary furnace, supplied also, preferably, with a stream of burning pulverized fuel and adapted for the incineration of dead animals and other combustible but bulky material—such as mattresses, boxes, crates, paper, rags, &c.—which may be supplied thereto either continuously or intermittently, as may be desired, the products of combustion derived from the burning material on the third grate passing also through the rotary cylinder-furnace, so as to assist in the combustion therein. In order that the three grates which are thus used in the stationary furnace may be subsequently referred to without confusion, I shall refer to the third or large grate as the "main" grate, to the first as the "auxiliary" grate, and to the second as the "fuel-starting" grate. The main stationary grate may, as stated, be supplied either continuously or intermittently with material to be consumed thereon, and it preferably is equipped with a suitable hopper and chute by which material will be directed thereto, together with suitable elevating apparatus for elevating material from the street-level to said hopper.

In further carrying my invention into effect I combine with an incinerating apparatus one or more boilers for supplying steam for the operation of motors connected with the incinerating apparatus or independent thereof, the products of combustion from the incinerating apparatus being directed either to said boiler or boilers and thence to a stack or directly to said stack, whereby the heat developed in the incinerating apparatus may be employed for a convenient industrial use.

In further carrying my invention into effect I employ a suction-fan the inlet of which is connected by a suitable pipe with the storage-hopper for the putrescible material and the outlet from which connects with the incinerating apparatus, whereby some or all of the air admitted to the incinerating apparatus for supporting combustion therein will be drawn partly through or over the storage-hopper, so that any gases mechanically evolved therefrom will be drawn into the incinerating apparatus and consumed or dissociated.

In further carrying my invention into effect I combine with the stationary furnace, which connects with the rotary cylinder-furnace, one or more burners supplied with pulverized fuel from a suitable pulverizing apparatus, the products of combustion from such burner or burners being directed into the rotary cylinder-furnace. The special utility of thus burning pulverized fuel in a garbage or analogous cremation apparatus is that the supply of such fuel can be regulated with the greatest accuracy, whereby the heat supplied by the burner or burners may be decreased as the material consumed in the rotary cylinder-furnace decreases, and vice versa, so that the incineration of the material can be carried on with the greatest economy.

Other features of novelty in my apparatus will be apparent from the following description, taken in connection with the accompanying drawings, forming a part of this specification, and in which—

Fig. 4$^a$, a section on the line $x\,x$ of Fig. 4.

In all of the above views corresponding parts are represented by the same numerals of reference.

Figure 1:
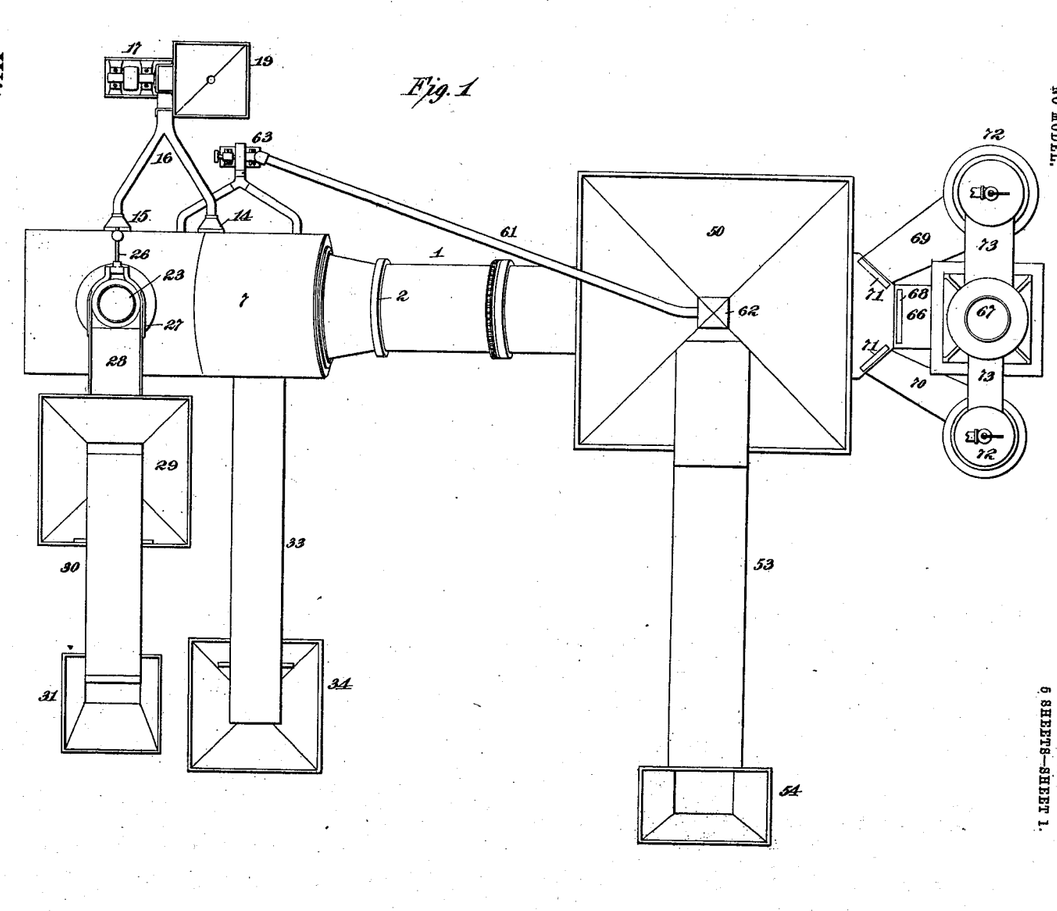
Figure 1 is a plan view of a cremating or incinerating apparatus in its preferred form, showing the combination therewith of a pair of vertical tubular boilers of different capacities.
Figure 5:
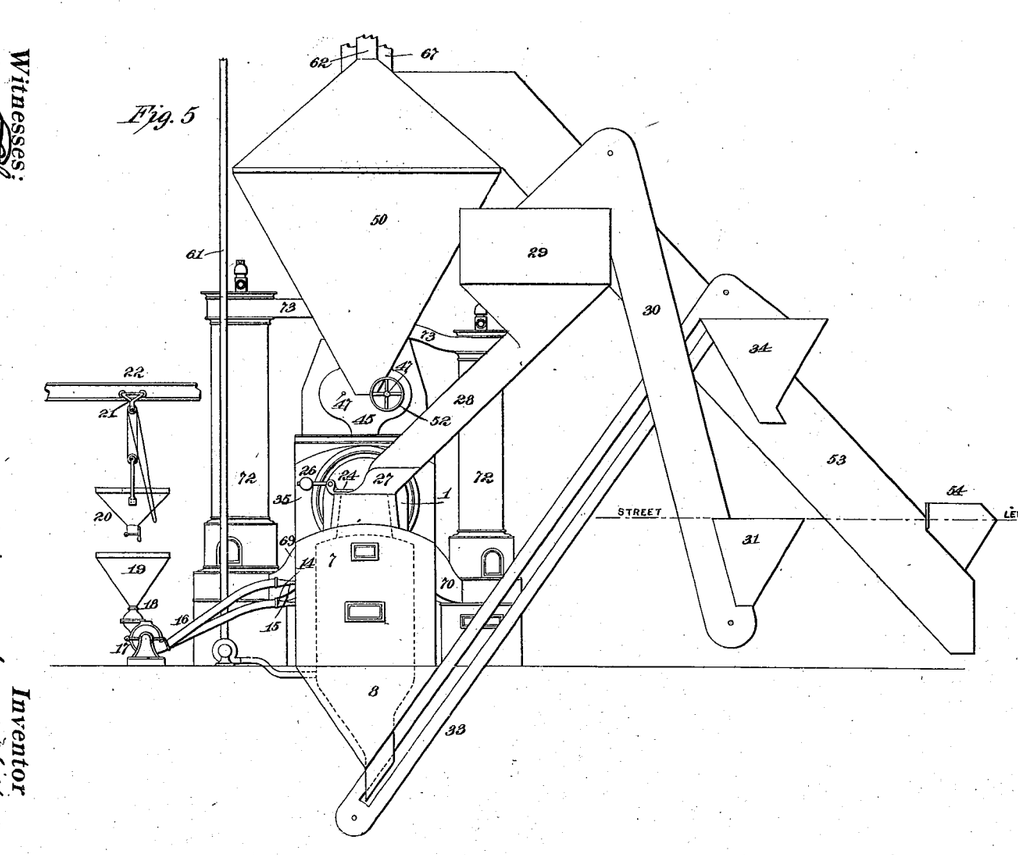
Fig. 5, an elevation of the apparatus from the stationary-furnace end.

1 represents a rotary cylinder-furnace made of heavy metal sections secured together by intermediate rings 2 2 and lined with fire-brick 3. The cylinder-furnace is supported on rollers 4 4 at the proper incline and the thrust is received by a roller 5, mounted on a vertical shaft. The cylinder-furnace is rotated in any suitable way, as from a shaft 6, which connects with the furnace by means of a sprocket-chain, as shown. At the lower or discharge end of the cylinder-furnace is a stationary furnace 7 of solid construction, formed with a tapered or hopper-like bottom 8 and carrying in the preferred instance a main shaking-grate 9, a fire-starting grate 10, and an auxiliary shaking-grate 11, arranged approximately in the relations indicated, the auxiliary grate being located immediately below the discharge end of the cylinder-furnace. Above the starting-grate 10 is a combustion-chamber 12, one wall of which is curved, as at 13, toward the mouth of the cylinder-furnace, and leading within said combustion-chamber 12 is a twyer 14 or other burner for pulverized fuel. The combustion-chamber over the main grate 9 is also preferably provided with a twyer or other burner 15 for pulverized fuel, and these twyers connect by pipes 16, as shown in Figs. 1 and 5, with a pulverizer 17 of any suitable type, said pulverizer being arranged to reduce coal into a condition of fine powder and to mix the pulverized fuel with the proper proportion of air as to result in the desired combustion. The pulverizer 17 is provided with any suitable form of feed device 18, by which a regulable supply of material can be fed thereto, and with a hopper 19 for supplying the feed device. I illustrate a dumping-bucket 20 suspended from a carrier 21, running on the track 22, by which the coal to be pulverized may be supplied to the hopper 19. Opening into the stationary furnace immediately above the main grate is an opening 23, preferably large enough to admit a horse or other animal to be cremated, as well as other bulky material, such as mattresses, boxes, crates, paper, rags, &c. The opening 23 is adapted to be closed by a cover 24, pivoted to a weighted lever 26. Around the opening 23 is a hopper 27, to which leads an open chute 28 from a hopper 29. The hopper 29 is supplied with the material by an elevator 30 of any suitable construction, which at its lower end connects with a hopper 31, the mouth of which is, as indicated, located on the street-level, so that the carts can dump directly therein. The ash discharged from the several grates of the stationary furnace 7 and from the rotary cylinder-furnace 1 through the grate 11 passes through an opening 32 to an elevator 33 of any suitable type and is conveyed to a hopper 34, sufficiently elevated above the street-level as to permit the loading of carts by gravity. The cylinder-furnace connects at its upper or feed end with an air-mixing and gas-combustion chamber 35, made generally rectangular in form and provided with a fire-brick grate 36 and with a perforated diaphragm 37, through which the products of combustion from the cylinder require to pass. The additional air-supply necessary to result in the dissociation of the gases may be furnished in any suitable way, as through a pipe 38.

Figure 2:
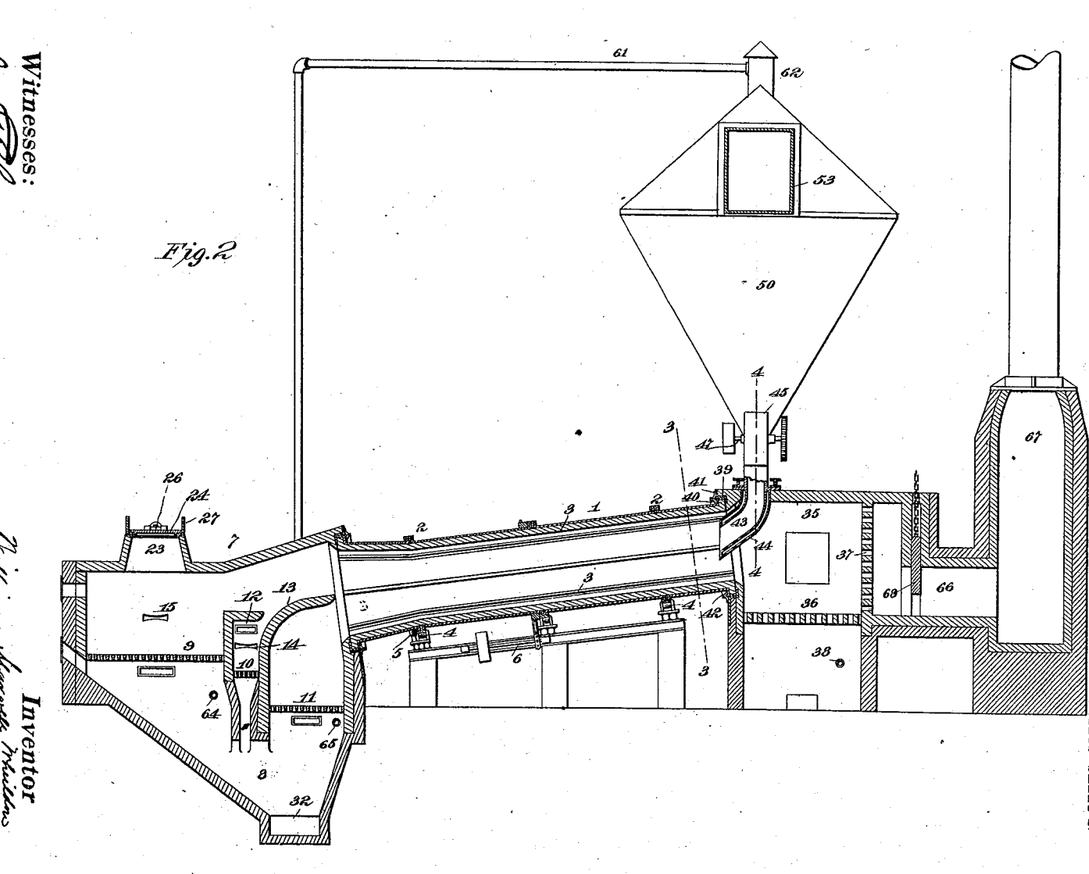
Fig. 2, a longitudinal sectional view through the apparatus.
Figure 6:
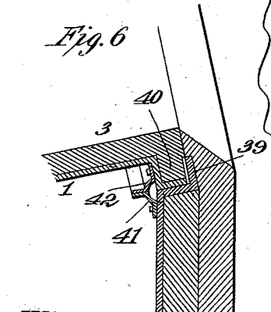
Fig. 6, a detail view illustrating the form of joint at the ends of the rotary cylinder-furnace on an enlarged scale, and Fig. 7 a section on the line 7 7 of Fig. 3.

The joint between the ends of the cylinder-furnace and the stationary furnace and air-mixing and gas-combustion chamber, respectively, may be of any suitable type, the preferred construction being shown in Fig. 2 and on an enlarged scale in Fig. 6.

39 represents a ring into which each end of the cylinder bears, the end of the cylinder being formed with a shoulder 40, as shown, whereby the fire-brick lining of the cylinder will entirely cover the joint formed between the shoulder 40 and the ring 39, so as to protect the same.

41 is a light sheet-metal apron surrounding each end of the cylinder and secured to the wall of the stationary furnace or gas-combustion chamber, as the case may be, and 42 is a corresponding flexible apron carried by the cylinder and working tightly against the apron 41, whereby a tight joint between the aprons will be formed and circulation of the intensely-heated air around the ends of the cylinder will be prevented.

Material is fed to the upper or feed end of the cylinder-furnace by a feed-pipe 43, which extends slightly into the same and which is provided with a water-jacket 44, through which is maintained a circulation of water to prevent overheating of the feed-pipe, said jacket extending through the thickness of the top wall of the gas-combustion chamber, as shown. Connected at the upper end of the feed-pipe 43 is a chamber 45, containing the feed mechanism proper, the preferred construction of which mechanism is shown more clearly in Fig. 4, to which attention is now directed.

Figure 4:
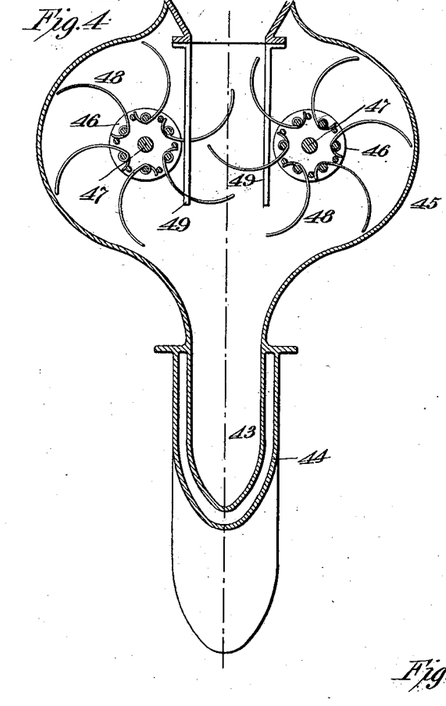
Fig. 4, a section on the line 4 4 of Fig. 2, illustrating the preferred construction of feed mechanism from the storage-hopper.
Figure 4A:
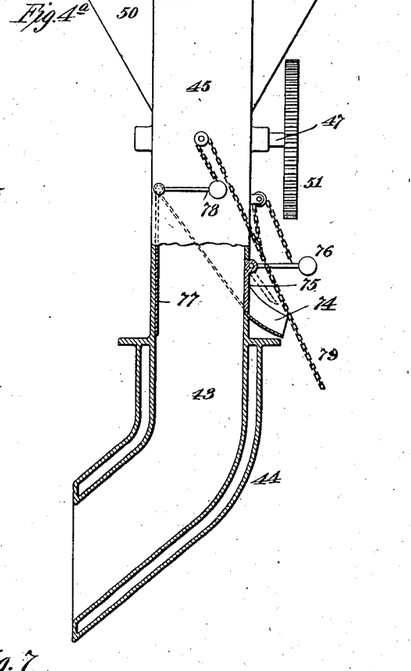

46 46 represent two drums mounted on shafts 47 47 in the casing 45, each drum carrying a set of elastic or spring fingers 48, which work between the teeth of two combs 49 49. Mounted above the casing 45 is the main storage hopper or receptacle 50 for the putrescible material, the discharge from said hopper leading between the two combs 49, whereby material from the lower end of said hopper will be drawn out by the fingers 48 and allowed to drop by gravity through the feed-pipe 43. By running the finger 48 between comb-teeth, as explained, they will be cleansed of any accumulating matter thereon, while by using spring-fingers for the purpose the passage of any solid substance, such as a brick or stone, between them will do no damage. The two drums 46 are rotated together in any suitable way—as, for example, by means of intermeshing spur-gears 51 on the shafts 47, one of said shafts being driven by the pulley 52.

Figure 3:
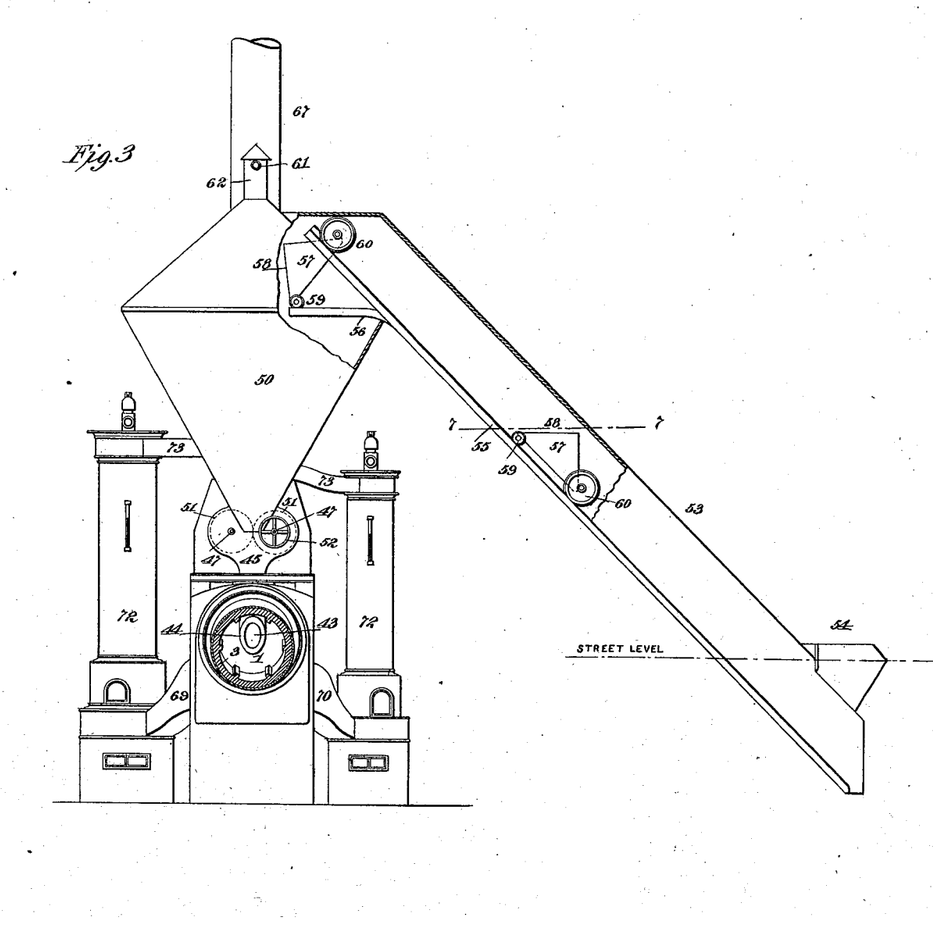
Fig. 3, a section on the line 3 3 of Fig. 2 looking toward the right.
Figure 7:
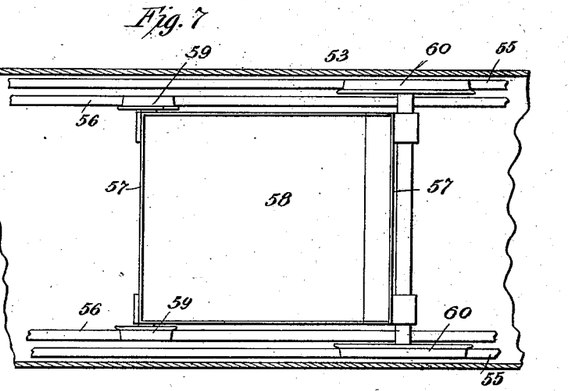

Material is supplied to the main hopper or storage-receptacle 50 in any suitable way, but preferably by a device wherein the possibility of the dissemination of noxious gases into the atmosphere will be avoided or reduced to a minimum, the preferable construction of such mechanism being that indicated particularly in Figs. 3 and 7.

53 represents an inclined tight, preferably sheet-iron, casing, which leads into the hopper 50, as shown, at its upper end, and which connects at its lower end with a hopper 54, arranged at about the street-level, so that the carts can dump directly therein. Carried on the bottom of the inclined casing 53 are two outside tracks 55 and two inside tracks 56, as shown.

57 represents a car provided with an opening 58 and having wheels 59, which travel on the tracks 56, and wheels 60, which travel on the tracks 55. The tracks 55 extend, as shown, throughout substantially the entire length of the casing 53, while the tracks 56 are turned horizontally through the opening which connects the upper end of the casing 53 with the hopper 50. The capacity of the car 57 is preferably at least equal to that of one of the dumping-carts used for the collection of the material, so that at least a cartload at a time may be dumped into the car 57, which may then be elevated up the tracks within the casing 53 in any suitable way. As the car reaches the top of the casing the front wheels 59 follow the inside tracks 56, so as to dump the car and discharge the contents thereof into the hopper.

In order to prevent dissemination of mechanically-evolved obnoxious gases from the hopper 50, I employ an air-pipe 61, which leads from the top of the hopper or from a cupola 62 thereon to a small centrifugal blower 63, from which extend, preferably, two branch pipes 64 65, leading beneath the main and auxiliary grates, respectively. Air for supporting combustion of material on the grates will therefore be supplied in whole or in part by the fan 63, and such air will be drawn up through the casing 53, so that there will always be a circulation through the same upwardly. Any gases mechanically evolved from the material in the hopper will also be drawn by suction through the pipe 61 and discharged into the combustion apparatus, so as to be consumed therein or otherwise deodorized.

Referring again to the air-mixing and gas-combustion chamber, I show a main flue 66, which connects the back of said chamber with a stack 67, said flue being provided with a fire-brick damper 68, by which the flue can be shut off or opened to any desired extent. Extending out from the back of the combustion-chamber, as shown particularly in Fig. 1, are branch flues 69 and 70, having fire-brick dampers 71 therein, said branch flues leading to the bottom of a pair of vertical boilers 72 of any suitable type, whereby the products of combustion can be directed to either or both of said boilers. From the top of the boilers branch flues 73 return to the stack, so that the products of combustion after passing through the boilers will be directed into the stack. The boilers 72 may be of different capacities or of the same capacity, as will be obvious.

In order to provide for the effective agitation or tumbling of the material within the cylinder-furnace 1, certain of the fire-bricks 3, forming the lining thereof, are of an increased width, as shown in Fig. 3, so as to form a series of ledges or shoulders on the bore of said cylinder, as will be obvious, whereby the rotation of the cylinder-furnace will carry up the material and cause it to fall vertically through the cylinder-furnace as it progresses lengthwise thereof by reason of the inclination of the latter.

In order to prevent the dripping of watery portions of the material from entering the cylinder-burner when the plant is at rest, I prefer to employ the construction of deflecting-diaphragms mounted in the feed-pipe 43, as shown particularly in Fig. 4ª.

74 represents a drip-pipe which leads out of the feed-pipe 43 immediately below the casing 45 and which may be connected to the sewer or to a suitable receiving-tank. This drip-pipe is adapted to be normally closed by a damper 75, connected to a weighted lever 76. Mounted within the feed-pipe 43 is a damper 77, adapted to be moved to the position shown in dotted lines in Fig. 4ª, so as to register with the bottom edge of the opening to the drip-pipe 74. The damper 77 is connected to a weighted lever 78, and the levers 76 and 78 are connected to a chain 79, as shown, whereby by pulling down on said chain the dampers 75 and 77 may be moved to the position shown in dotted lines, so that any drip of liquid material from the casing 45 will pass into the drip-pipe 74. Normally the dampers 75 and 77 occupy the position shown in full lines, so that the material from the casing 45 will be fed, through the pipe 43, into the cylinder-furnace.

The stationary furnace 7 is provided with suitable doors, as shown, by which it may be entered for cleaning, for the removal of ash, or for other purposes, while the gas-combustion chamber is provided with corresponding doors for the same purposes.

The operation of the specific apparatus described will be as follows: A fire is first built upon the grate of one of the boilers 72, so as to generate steam therein for running the pulverizer 17 and for rotating the cylinder-furnace. A fire is started on the grate 10 for the purpose of igniting the column of pulverized fuel which is delivered, through the twyer 14, from the pulverizer as soon as sufficient steam has been generated in the boiler to operate the same. The cylinder-furnace is then started in rotation, and the introduction of the pulverized fuel commences. Under the influence of the intense blowpipe-flame derived from the stream of burning pulverized fuel and which practically fills the revolving cylinder-furnace the latter soon becomes heated to a bright-red or white heat or to any other temperature that may be desired. During this operation the dampers 71 are open and the damper 68 is closed, whereby the products of combustion pass through both of the boilers. Assuming that the garbage-bin 50 has been supplied with sufficient material, the automatic feeder is started, and the feed-fingers 48 force the material into the feed-pipe 43, from which it falls by gravity into the heated cylinder-furnace. The comparatively wet material falls from the mouth of the feed-chute in a thin and practically uniform stream upon the hot brick-lining of the cylinder and is caught, as stated, by the projecting bricks or shelves and carried up the side of the cylinder, falling back through the hot flame and gases to the bottom, this tumbling operation being repeated on the material as it progresses slowly through the furnace, whereby the material will be thoroughly exposed to the products of combustion passing through the cylinder. From the moment that the wet or damp material is introduced into the cylinder it rapidly begins to lose its moisture, so that before it has passed very far down the cylinder it is sufficiently dry, under ordinary conditions, to be consumed, and it becomes ignited, so as to add greatly to the heating effect within the cylinder.

It is to be observed that the arrangement of the cylinder is such as to cause the material to move in an opposite direction from that of the hot flame and gases produced by the combustion of the previously-introduced combustible material, and in this manner I obtain a progressive drying, ignition, and combustion of the material introduced, which results are successively effected as such material passes toward the discharge end of the cylinder. The material fed into the cylinder may, by regulating the speed of its rotation or the angle of its inclination, be retained under the effect of the heat for any desired period. Any large lumps of the combustible material which may escape from the cylinder unconsumed will fall upon the dumping-grate 11, where they will be retained until combustion thereof is completed.

The steam driven off from the freshly-introduced material, together with all the generated gases and products of combustion of the material supplied in both the revolving cylinder-furnace and in the stationary furnace, passes directly into the gas mixing and combustion chamber, where, under the combined action of the high temperature and an additional supply of oxygen furnished in any suitable way—as, for instance, through the pipe 38—the gases become purified and rendered innocuous. Ordinarily the noxious fumes generated from the solid matter may be deodorized at a temperature of about 1,300° Fahrenheit; but a higher temperature of not less than 2,000° Fahrenheit is desirable in order to secure the complete destruction of all disease-producing germs, as well as to dissociate all offensive vapors and gases evolved. With my apparatus all organic substances are converted into ash and the harmless forms of water-vapors, carbonic acid, and nitrogen, while any small quantity of sulfurous acid produced by the dissociation of sulfureted hydrogen is so insignificant in quantity as to be imperceptible to the senses. This dissociation of the gases is secured not only by means of the complete combustion obtained in the furnace proper, but by the supplemented action which takes place in the gas mixing and combustion chamber, where an additional supply of air is added to the highly-heated gases.

When it is desired to incinerate materials—such as dead animals, mattresses, boxes, crates, paper, rags, &c.—which it may be undesirable or impossible to consume in the rotary cylinder-furnace, such materials are deposited in the hopper 31 and are conveyed by the elevator 30 to the hopper 29, from which they pass by the chute 28 upon the grate 9. Pulverized fuel from the pulverizer will be forced through the twyer 15 and ignited, so as to quickly consume and incinerate such materials, the products of combustion therefrom passing into the cylinder-furnace, as will be obvious.

Having now described my invention, what I claim as new, and desire to secure by Letters Patent, is as follows:

1. In an incineration or cremation furnace, the combination with a rotary imperforate cylinder-furnace supported at an incline, of a stationary furnace at the lower end thereof and connected therewith, the opening from the stationary furnace corresponding substantially with the bore of the rotary furnace, means within the stationary furnace for generating combustion-gases which pass through the rotary furnace, an auxiliary grate within the stationary furnace immediately below the lower end of the rotary furnace and onto which unconsumed products from the latter fall, a curved partition above the auxiliary grate for directing the products of combustion therefrom into the rotary furnace, and means for feeding the material to be cremated to the rotary furnace at its upper end, substantially as set forth.

2. In an incineration or cremation furnace, the combination with a rotary cylinder-furnace, of a water-jacketed feed-pipe for supplying material thereto, a main hopper or receptacle for holding material, a feed mechanism casing connecting said hopper with the feed-pipe, and a feed device in said casing comprising a pair of drums carrying elastic fingers and comb-teeth between which said fingers work, substantially as set forth.

3. In an incineration or cremation furnace, the combination with a rotary cylinder-furnace, of a feed-pipe for supplying material thereto, a hopper or receptacle for containing said material, a drip-pipe leading from the feed-pipe above the cylinder, and a damper in the feed-pipe arranged to direct the liquid matter into the drip-pipe when the damper is moved to close the feed-pipe, substantially as set forth.

4. In an incineration or cremation furnace, the combination with a rotary cylinder-furnace, of a feed-pipe for supplying material thereto, a hopper or receptacle for containing said material, a drip-pipe leading from the feed-pipe above the cylinder, a damper in the feed-pipe arranged to direct the liquid matter into the drip-pipe when the damper is moved to close the feed-pipe, and a damper in said drip-pipe for opening the latter, substantially as set forth.

5. In an incineration or cremation furnace, the combination with a rotary cylinder-furnace, of a feed-pipe for supplying material thereto, a hopper or receptacle for containing said material, a drip-pipe leading from the feed-pipe above the cylinder, a damper in the feed-pipe arranged to direct the liquid matter into the drip-pipe when the damper is moved to close the feed-pipe, a damper in said drip-pipe for opening the latter, and means for simultaneously operating said dampers, substantially as set forth.

6. The combination with a cremating or incinerating apparatus, of a storage-tank for holding material to be supplied thereto, means for drawing air directly through the storage-tank and forcing such air into the cremating or incinerating apparatus, and a conduit connecting said tank with the atmosphere and through which the air may enter, substantially as set forth.

This specification signed and witnessed this 14th day of June, 1900.

WILLIAM MAXWELL WHEILDON.

Witnesses:
FRANK L. DYER,
JNO. R. TAYLOR.